INVENTOR.
Arthur E. Brown

July 10, 1951  A. E. BROWN  2,559,590
ROTARY FLUID MECHANISM
Filed Feb. 3, 1948  2 Sheets-Sheet 2

INVENTOR.
Arthur E. Brown

Patented July 10, 1951

2,559,590

UNITED STATES PATENT OFFICE 2,559,590

ROTARY FLUID MECHANISM

Arthur E. Brown, Salt Lake City, Utah

Application February 3, 1948, Serial No. 6,002

6 Claims. (Cl. 230—141)

My invention relates to improvements in rotary fluid mechanisms of the coacting rotor type. The objects of my invention are, first, to secure more effective sealing cooperation among the rotors and the casing; second, to provide working surfaces which facilitate ease of construction; third to provide means for compressing or expanding compressible fluids in a more efficient manner; and fourth, to provide a more rigid construction of the rotors.

I attain these objects by mechanism illustrated in the accompanying 15 drawings, in which—

Figure 1:
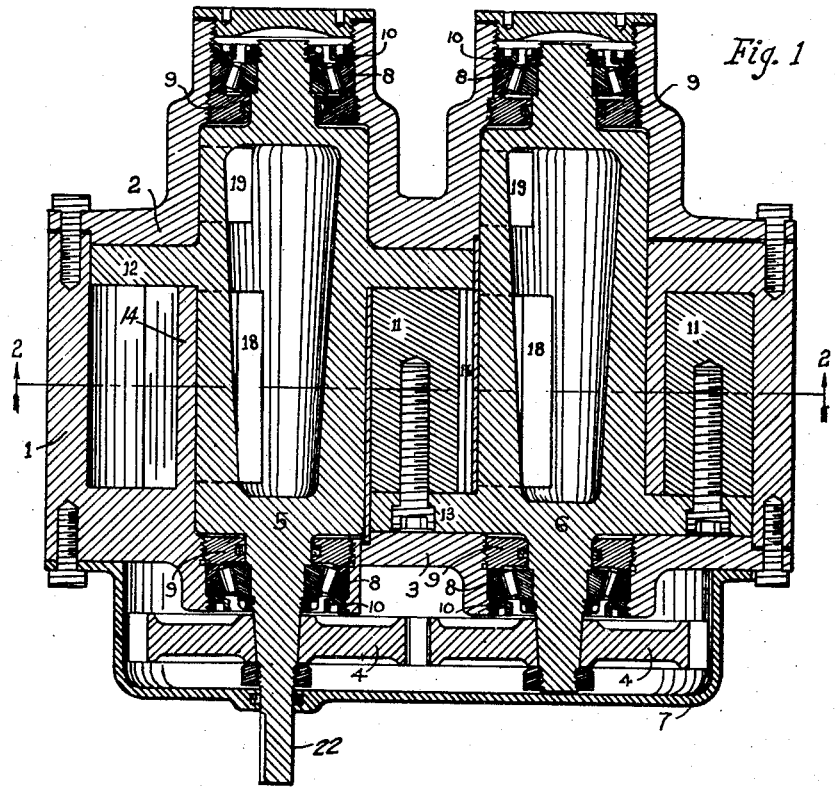
Figure 2:
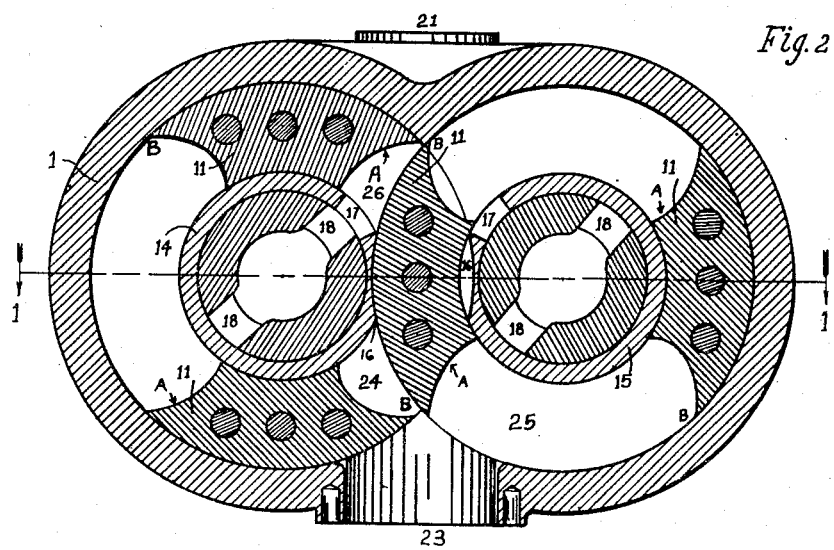
Figure 3:
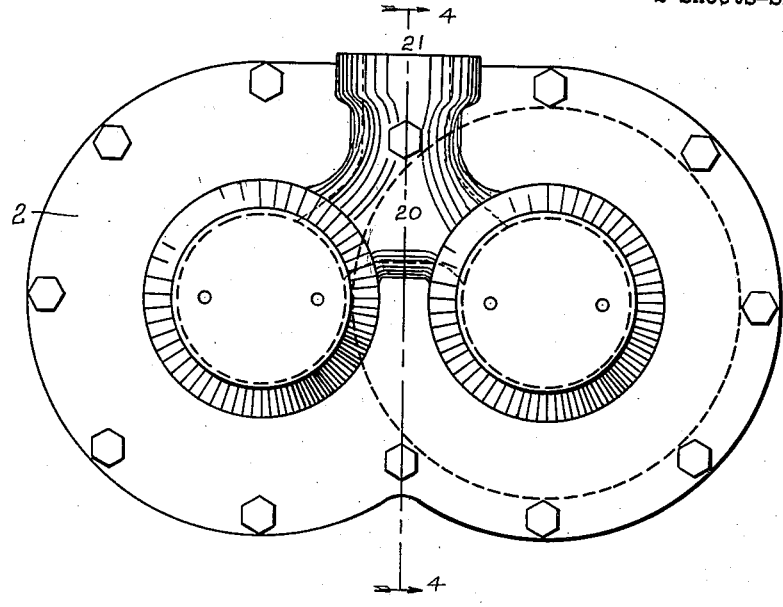
Figure 4:
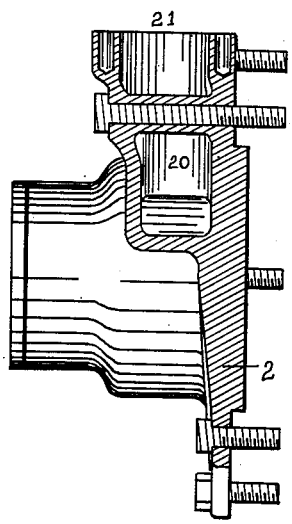

Figure 1 is a longitudinal sectional view of the entire machine. Figure 2 is a transverse section of the machine on the line 2—2, Fig. 1. Fig. 3 is an view of the machine. Fig. 4 is a section of the cover plate 2 and its bolts on the line 4—4, Fig. 3.

While I have shown only the preferred form of my invention, I wish to have it understood that various modifications may be made within the scope of the claims hereto attached without departing from the spirit of the invention.

Similar numerals of reference designate corresponding parts throughout the several figures.

The casing 1 and cover plates 2 and 3 enclose the rotors. The pilot gears 4—4 are mounted on the rotor shafts 5—6 and are enclosed by the gear cover 7. The tapered roller bearings 8—8—8—8 carry the radial and thrust loads of the rotors and the position of the tapered roller bearings may be adjusted by turning the screw stops 9—9—9—9 and 10—10—10—10. The pistons 11—11—11—11 are fastened by means of bolts to the flanges 12 and 13. As illustrated two pistons are fastened to each rotor; however, there may be more or less than two. The flanges 12 and 13 are affixed to the rotor shafts 5 and 6. The flanges are located one at each axial end of the machine. Locating a flange at each axial end, instead of both at the same end, permits the flange to be of a diameter as large as the overall diameter of the rotor and thence allows a more rigid connection of a piston to a flange. The bolted connection of the pistons to the flange permits continuous turning in forming the surfaces of the flange which are perpendicular to the rotor axes. The pistons 11—11—11—11 rotate about the fixed hollow cylinders 14 and 15. The said hollow cylinders are integral with the casing. In each hollow cylinder 14 and 15 there is a groove 16 of annular section, the radius of which is equal to the outer radius of the pistons. The outer portions of the pistons pass through the groove 16 and thus an area contact seal between the parts is maintained for a large portion of the cycle. A line contact seal between the ends of the pistons is in effect for a short portion of the cycle. The end surfaces A—A—A—A of the pistons are surfaces having a superior epitrochoid profile and are generated by the edges B—B—B—B of the pistons. The surfaces (of the pistons) having arcuate sections are cylindrical as shown though they could be slightly conical if desired. A cylindrical surface is a special case for conical surfaces. Each of the fixed hollow cylinders 14 and 15 has a port 17—17 through which the working fluid may flow. Each rotor shaft 5 and 6 is hollow throughout a portion of its length. Each rotor shaft has four ports 18—18 and 19—19 opening off from the hollow portion of the shaft. Each port 18 passes from the exterior of its respective shaft, through the shell of its respective shaft, and into the axial aperture of its respective shaft. The ports 18—18 communicate with the port 17 in the fixed hollow cylinder 14 or 15 and serve as a rotary valve. The two ports 19—19 communicate with the manifold 20. The manifold 20 serves the port 21. The drive shaft 22 extends through the gear cover 7. The port 23 opens directly into the space where the pistons rotate.

When operating as a pump, the drive shaft 22 is rotated in a clockwise direction (looking at the drive shaft end of the machine). The working fluid is drawn in through the port 23 and into the spaces 24 and 25. The working fluid is carried around by the pistons 11—11—11—11 to a point where one piston forms an abutment and another piston compresses the working fluid. When the working fluid is compressed to a certain degree, the port 18 in the hollow rotor shaft begins to overlap the port 17 in the fixed hollow cylinder 14 or 15. The working fluid passes through the passage thus formed by the rotary valve into the hollow portion of the rotor shaft. Thence it passes out the port 19 ino the manifold 20 and out the port 21.

When operating as an engine, the working fluid under pressure enters the port 21, flows through the manifold 20, through port 19, and into the hollow rotor shaft 5 or 6. The rotor carrying the drive shaft 22 now rotates counterclockwise (looking at the drive shaft end of the machine); and the other rotor turns clockwise. When the port 18 in the hollow rotor shaft 5 or 6 begins to overlap the port 17 in the fixed hollow cylinder 14 or 15 then the working fluid flows through the passage thus formed and into space 26. Thereupon pressure of the working fluid will act upon a piston and cause the rotors to turn. When the rotors have rotated a portion of the cycle and the port 18 no longer overlaps the port 17, then the supply of working fluid is momentarily cut off by the action of the rotary valve. The working fluid within the machine is then allowed to expand against a piston so as to use the working fluid in an economical manner. The working fluid then travels around with the pistons and is exhausted out port 23.

I claim:

1. In a rotor for a rotary mechanism adapted for use with a working fluid, a shaft, a flange rigidly attached to said shaft, said flange having a plane surface perpendicular to the axis of said shaft, a piston rigidly attached to said flange, said piston having a convex conical surface and a concave conical surface, said conical surfaces having the same axis as said shaft, said flange and said piston being located at different axial positions along said shaft such that a radial space is located between said shaft and said piston, said shaft having an axial aperture for passage of the working fluid, a port passing from the exterior of said shaft through the shell of said shaft into said axial aperture of said shaft, and said port being provided for passage of the working fluid.

2. In a rotary fluid mechanism adapted for use with a working fluid; a casing; a pair of co-acting rotors rotatably mounted in said casing; pilot gears constraining said rotors to rotate in proper timed relation; each of said rotors comprising a shaft, a flange rigidly fastened to said shaft, and a piston; each flange having a plane surface perpendicular to the axis of its respective shaft; each piston being rigidly fastened to its respective flange; each piston having a convex cylindrical surface and a concave cylindrical surface; said cylindrical surfaces of each piston having substantially the same axis as their respective shaft; each flange and each piston being located at different axial positions along their respective shaft; two hollow cylinders fixed to the casing; the piston of each rotor being rotatable about its respective fixed hollow cylinder; each fixed hollow cylinder having a groove oriented parallel to the axes of said rotors; said grooves each having a radius equal to the radius of a rotor plus clearance; each rotor being cooperative with the groove in the hollow cylinder located within the opposite rotor; each of said shafts having an axial aperture for passage of the working fluid; each of said shafts having a radial port passing from the exterior of said shafts into said axial aperture of said shafts; each of said fixed hollow cylinders having a port passing through their shell; and said ports in said fixed hollow cylinders adapted to register with said radial ports in said shafts to function as rotary valves for controlling the flow of the working fluid.

3. In a rotary fluid mechanism adapted for use with a working fluid; a casing; a plurality of coacting rotors rotatably mounted in said casing; pilot gears constraining said rotors to rotate in proper timed relation; at least one of said rotors comprising a shaft, a flange rigidly fastened to said shaft, and at least one piston; said flange having a plane surface perpendicular to the axis of said shaft; said piston being fastened rigidly to said flange; said piston having a convex cylindrical surface and a concave cylindrical surface; said cylindrical surfaces of said piston having the same axis as said shaft; said flange and said piston being located at different axial positions along said shaft; a hollow cylinder fixed to the casing; said piston being rotatable about said fixed hollow cylinder; said fixed hollow cylinder having a groove oriented parallel to the axis of said fixed hollow cylinder and intersected by the plane common to both axes of a pair of coacting rotors; said groove having a radius equal to the radius of a rotor plus clearance; said groove being cooperative with the periphery of a coacting rotor; said shaft having an axial aperture for passage of the working fluid; said shaft having a port passing from the exterior of said shaft through the shell of said shaft into said axial aperture of said shaft; said fixed hollow cylinder having a port passing through its shell; and said port in said fixed hollow cylinder adapted to register with said port in said shaft to function as a rotary valve for controlling the flow of the working fluid.

4. In a rotary compressor adapted for use with a working fluid; a casing; a pair of coacting rotors rotatably mounted in said casing; pilot gears constraining said rotors to rotate together in proper timed relation; at least one of said rotors having a shaft, a flange rigidly attached to said shaft, and a piston rigidly attached to said flange; said flange having a plane surface perpendicular to the axis of said shaft; said piston having a convex cylindrical surface and a concave cylindrical surface; said cylindrical surfaces having the same axis as said shaft; said flange and said piston being located at different axial positions along said shaft; a hollow cylinder fixed to the casing; said piston being rotatable about said hollow cylinder; a compression chamber bounded by a portion of said casing, the plane surface of said flange, the convex cylindrical surface of one rotor, another surface of the other rotor, and the convex surface of said fixed hollow cylinder; a rotary valve rotatable in proper timed relation with said piston; said rotary valve serving to confine the working fluid in said compression chamber until it has been compressed to a certain degree before exposing it to the pressure of the working fluid previously compressed; a port fixed relative to said casing; said rotary valve comprising a port carried by a rotor adapted to register in proper timed relation with said port which is fixed relative to said casing; and the working fluid adapted to flow through said ports.

5. In a rotor for a rotary mechanism adapted for use with a working fluid, a shaft, a flange rigidly attached to said shaft, said flange having a plane surface perpendicular to the axis of said shaft, a piston rigidly attached to said flange, said piston having a convex cylindrical surface and a concave cylindrical surface, said cylindrical surfaces having the same axis as said shaft, said flange and said piston being located at different axial positions along said shaft, said shaft having an axial aperture for passage of the working fluid, a port passing from the exterior of said shaft through the shell of said shaft into said axial aperture of said shaft, and said port being provided for passage of the working fluid.

6. In a rotary mechanism adapted for use with a working fluid; a casing; a plurality of coacting rotors rotatably mounted in said casing; pilot gears constraining said rotors to rotate in proper timed relation; at least one of said rotors having a shaft, a flange rigidly mounted on said shaft, and at least one piston rigidly attached to said flange; said flange having a plane surface perpendicular to the axis of said shaft; said flange and said piston being located at different axial positions along said shaft; a hollow cylinder fixed to the casing; said piston being rotatable about said fixed hollow cylinder; said fixed hollow cylinder having a radially directed port passing through its shell; said radially directed port being provided for passage of the working fluid; said shaft having an axially directed passageway for passage of the working fluid; and rotary valve means adapted to control the flow of the working fluid through said radially directed port.

ARTHUR E. BROWN.

REFERENCES CITED

The following references are of record in the file of this patent:

UNITED STATES PATENTS

| Number | Name | Date |
| --- | --- | --- |
| 53,915 | Behrens | Apr. 10, 1866 |
| 593,514 | Chaudum | Nov. 9, 1897 |
| 713,443 | Jewell | Nov. 11, 1902 |
| 883,894 | Knowles | Apr. 7, 1908 |
| 1,002,176 | Raclot et al. | Aug. 29, 1911 |
| 1,257,744 | Schorr | Feb. 26, 1918 |
| 2,228,933 | Thomson | Jan. 14, 1941 |

FOREIGN PATENTS

| Number | Country | Date |
| --- | --- | --- |
| 55,885 | Sweden | Jan. 15, 1924 |
| 627,202 | France | May 30, 1927 |